United States Patent [19]

Brusko et al.

[11] Patent Number: 5,680,963
[45] Date of Patent: Oct. 28, 1997

[54] MOLTEN THERMOPLASTIC MATERIAL SUPPLY SYSTEM WITH SUPPORT HARNESS FOR DISTRIBUTION MANIFOLD

[75] Inventors: Paul S. Brusko, Flowery Branch; Shahid A. Siddiqui, Roswell; Carl C. Cucuzza, Loganville, all of Ga.

[73] Assignee: Nordson Corporation, Westlake, Ohio

[21] Appl. No.: 550,387

[22] Filed: Oct. 30, 1995

[51] Int. Cl.$^6$ .................................................... B67D 5/62
[52] U.S. Cl. ............................. 222/146.5; 222/421
[58] Field of Search .......................... 222/146.1, 146.2, 222/146.5; 219/420, 421, 422, 424, 426, 427

[56] References Cited

U.S. PATENT DOCUMENTS

| | | | |
|---|---|---|---|
| 2,544,661 | 3/1951 | Fossa | 222/146.5 X |
| 3,792,801 | 2/1974 | Baker et al. | 222/146.5 |
| 3,827,603 | 8/1974 | Reighard et al. | 222/146.5 |
| 3,878,105 | 4/1975 | Kelling | 222/146.5 X |
| 3,964,645 | 6/1976 | Scholl | 222/146.5 |

Primary Examiner—Kevin P. Shaver
Attorney, Agent, or Firm—Rankin, Hill, Lewis & Clark

[57] ABSTRACT

A system for supplying melted thermoplastic material to a dispenser a hopper, a heating grid, and a reservoir block providing a reservoir. A support harness is attached to the bottom of the reservoir block. A manifold assembly is supported in the harness below the reservoir block for receiving material from the reservoir. The manifold assembly includes a pump for pumping the material to the dispenser. The manifold assembly is capable of moving vertically within the harness between an upper position in engagement with the reservoir block and a lower position, and the manifold assembly is capable of horizontal movement with respect to the support harness when it is in the lower position, so that the manifold assembly slides horizontally in and out of the support harness. A lifting mechanism connected to the support harness moves the manifold assembly vertically within the harness. The manifold assembly comprises a manifold block and a heater plate which has cast-in heater elements and which is removably attached to the manifold block.

15 Claims, 7 Drawing Sheets

MOLTEN THERMOPLASTIC MATERIAL SUPPLY SYSTEM WITH SUPPORT HARNESS FOR DISTRIBUTION MANIFOLD

BACKGROUND OF THE INVENTION

1. Field of the Invention

This invention relates to apparatus for melting and supplying thermoplastic materials to a dispensing system.

2. Description of the Prior Art

Thermoplastic materials or so-called "hot melt" materials have been used for many years for various purposes, including as adhesives in the manufacturing of products such as disposable diapers and in the manufacturing of packaging. Historically, the thermoplastic material was converted from a solid to a molten state in a tank having heated walls. The melted material was maintained in the molten state in the tank in sufficient volume to supply one or more applicators or dispensers. If the job or application required a substantial volume of hot melt material, a substantially large volume of material was required to be maintained in the molten or melted state, necessitating a long warm up or start up time for the apparatus, as well as prolonged exposure of at least some of the molten material to heat and/or to oxygen.

To avoid these problems, so-called grid-type hot melt supply systems were developed in which the solid thermoplastic material was stored in a hopper and melted upon the top of a heated grid located at the bottom of the hopper. The melted material then passed through holes in the grid into a relatively small holding reservoir from which the molten material was supplied by a pump beneath the reservoir to a dispenser. Grid-type supply systems have been capable of melting and supplying thermoplastic material in a very high rate, and the molten material is not maintained in a molten state for prolonged periods of time to char, oxidize, or otherwise degrade. A typical grid type hot melt supply system is disclosed in U.S. Pat. No. 3,946,645.

A supply manifold is typically provided, either as part of the body or block forming the reservoir or in a separate block located below the reservoir block. The molten thermoplastic material flows from the reservoir through passages in the manifold to a pump, which can be located in the manifold block. The molten material is fed by the pump from the supply manifold to an applicator through supply lines connected to the manifold. The manifold block, like the other elements of the supply system, must be heated to maintain the molten thermoplastic material at the desired temperature throughout the supply process, and this requires that heater cartridges be placed in the manifold or that the manifold have cast-in-place heater elements. If the cast-in heating elements fail, the entire manifold block must be replaced.

The passages in the manifold can also become clogged or elements of the manifold block may need to be repaired, so the manifold should be removable so that it can be repaired or replaced as necessary. Removal of the manifold block is, however, complicated since the manifold must form a sealing engagement with the reservoir block.

SUMMARY OF THE INVENTION

In accordance with the present invention, a unique saddle or harness is provided for mounting and supporting the manifold assembly. The harness supports the manifold assembly in the desired position and in sealing engagement with the reservoir assembly. The harness also allows the manifold assembly to be easily removed from the system for repair and replacement.

The harness of the present invention includes a screw jack assembly which allows the manifold assembly to be easily raised or lowered within the harness. The screw jack assembly raises the manifold assembly to place it in sealing engagement with the reservoir assembly. The screw jack assembly also allows the manifold assembly to be lowered from its engagement with the reservoir assembly, so that the manifold assembly can be easily removed for repair or replacement.

To remove the manifold assembly, the screw jack assembly is engaged to lower the manifold assembly, and the manifold assembly is pulled forward from the harness. To replace the manifold assembly, the manifold assembly can be slid into the harness from the front of the system and raised within the harness until it is in sealing engagement with the reservoir block. To facilitate sliding the manifold block within the harness, the harness is supplied with tracks along the bottom of the harness which engage corresponding slots in the bottom of the manifold assembly.

The raising and lowering of the manifold block within the harness is preferably accomplished with a screw jack assembly. The screw jack assembly includes a jack screw mounted in the bottom of the harness which engages an thrust bearing insert in the manifold assembly. By engaging and turning the jack screw assembly, the manifold assembly can be quickly and easily moved into place. The harness thus not only supports the weight of the manifold assembly, its also positions the manifold assembly relative to the reservoir block so that the manifold assembly can be inserted into the harness and accurately and easily raised into sealing engagement with the reservoir block.

In accordance with the present invention, the manifold block may be heated through the use of a separate heater plate which is removably attached to the bottom of the manifold block. The heater plate attached to the bottom of the manifold block provides an engagement for the screw jack assembly as the manifold assembly is raised and lowered. In addition, the heater plate may have a cast-in heating element which provides the necessary heat to the manifold block to maintain the molten thermoplastic material at the desired temperature. Since all of the heating function for the manifold block can be contained in the separate removable heating plate, the heating plate can be replaced as necessary if the heating elements fail, and it is not necessary to replace or repair the entire manifold block to fix an inoperative heating element.

These and other advantages are provided by the present invention of a system for supplying melted thermoplastic material to a dispenser. The system comprises a hopper for storing the thermoplastic material. A heating grid is associated with the hopper for heating and melting the thermoplastic material. A reservoir block receives melted material from the grid. The reservoir block includes a reservoir into which the melted material flows from the grid. A support harness is attached to the reservoir block. A manifold assembly is supported in the harness below the reservoir block for receiving material from the reservoir. The manifold assembly includes a pump for pumping the material to the dispenser.

Preferably, the manifold assembly is capable of moving vertically within the harness between an upper position in engagement with the reservoir block and a lower position, and the manifold assembly is capable of horizontal movement with respect to the support harness when it is in the lower position The system preferably comprises in addition a liking mechanism connected to the support harness for moving the manifold assembly vertically within the harness. The manifold assembly preferably slides horizontally in and out of the support harness. The support harness is preferably attached to the bottom of the reservoir block. The manifold assembly preferably comprises a manifold block and a heater plate removably attached to the manifold block.

DETAILED DESCRIPTION OF THE PREFERRED EMBODIMENT

Figure 1:
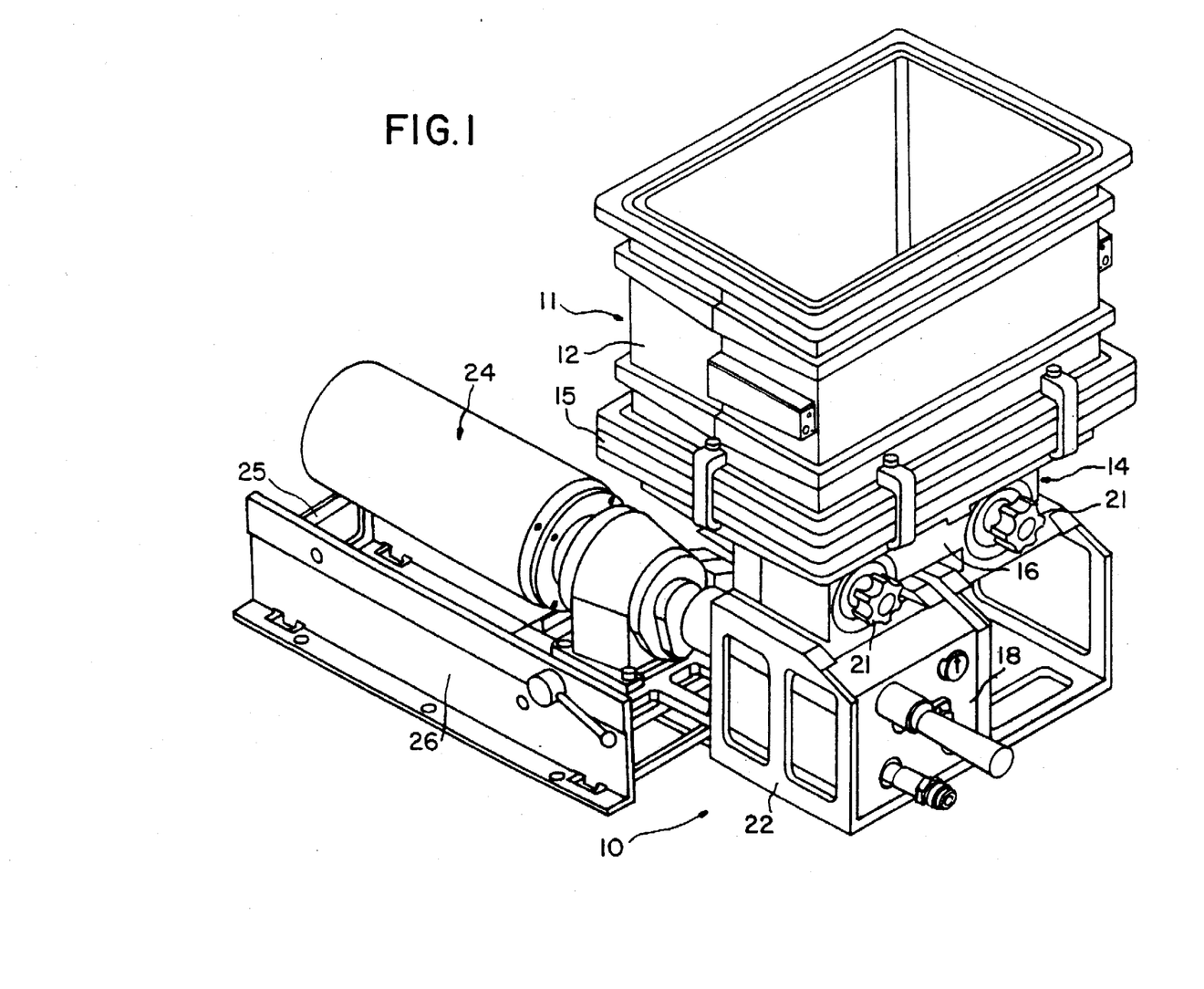
FIG. 1 is a perspective front view of the thermoplastic supply system of the present invention, with the support structure omitted.
Figure 2:
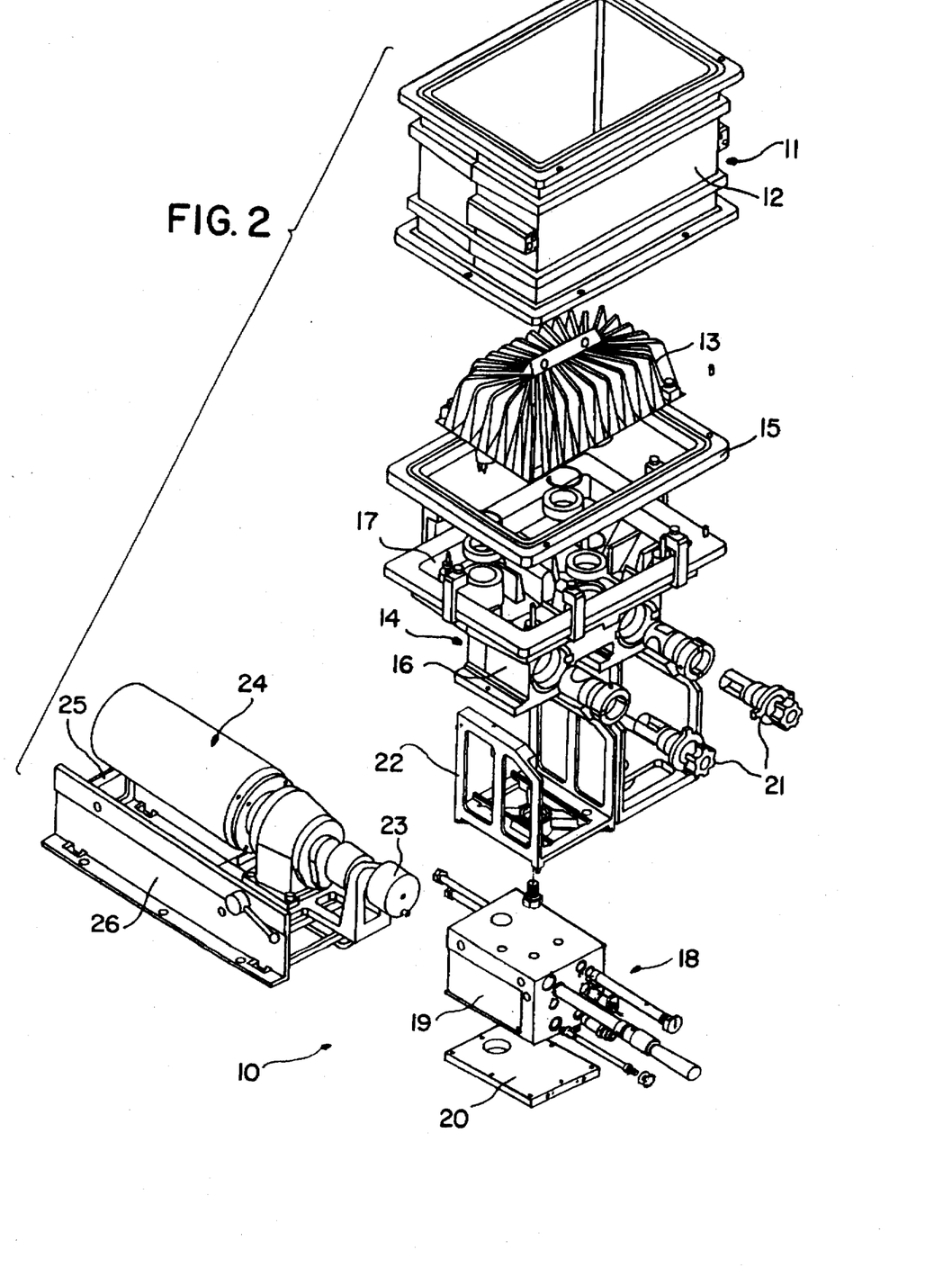
FIG. 2 is an exploded perspective front view of the thermoplastic supply system of FIG. 1.

Referring more particularly to the drawings and initially to FIGS. 1 and 2, there is shown the thermoplastic material supply system 10 of the present invention. The system is used for various purposes, such as to apply hot melt adhesive in a manufacturing line for specific products, such as for disposable diapers. A manufacturing line of disposable diapers may include, by way of example, a station for applying adhesive to the left and right leg elastic, to the waist elastic attachment and to the cuff elastic. The supply system 10 is connected to dispensers or applicators located at the manufacturing line by means of heated supply hoses. Various types of dispensers or applicators may be in the manufacturing line to apply the material, and these dispensers are not part of this invention. The supply system 10 is used to heat the solid thermoplastic material and to supply the molten material through various numbers of supply hoses to the dispensers.

The system 10 comprises a hopper assembly 11 for receiving and storing a supply of solid thermoplastic material. The hopper assembly 11 comprises one or more hopper units 12. The top of the hopper assembly 11 is open, allowing solid thermoplastic material to be placed in the hopper assembly. The bottom of the hopper assembly 11 is also open providing an outlet, and a heating grid 13 is mounted within the outlet of the hopper assembly. The heating grid 13 is used to melt the solid thermoplastic material in the hopper. Although the grid 13 is not in the form of a grid in the conventional definition of the term, since it is in the form of a pyramid-shaped cast block, it replaces the heating grids used in prior art systems, so it is called a "grid." The hopper assembly 11 is supported on a reservoir assembly 14 located below the hopper assembly 11, with a ceramic isolator 15 mounted therebetween. The reservoir assembly includes a block 16, the upper surface of which forms a reservoir 17 which receives a supply of melted material from the hopper assembly 11. Inside the reservoir block 16 are a pair of passageways through which the molten thermoplastic flows from the reservoir to a pair of manifold assemblies 18 positioned beneath the reservoir block. (Only one of the manifold assemblies is shown in FIGS. 1 and 2.) Each manifold assembly 18 includes a manifold block 19. The manifold block 19 may include an internal heater or may be heated by means of a separate attached heater plate 20. The reservoir assembly 14 includes a pair of flow shutoff valves 21 mounted in the reservoir block 16 each of which allows the flow of molten material through one of the passageways to one of the manifold assemblies to be shut off. Each of the flow shutoff valves 21 also includes a filter or protection screen to prevent extraneous particulate material from reaching the pump. The manifold assemblies 18 are inserted into a manifold harness or saddle 22 which is suspended from the bottom of the reservoir block 16. The manifold assembly is inserted into the harness and held securely against the reservoir block by means of a screw jack assembly. A pump 23 is adapted to be inserted into each of the manifold assemblies 18. Each of the pumps 23 is connected to a drive assembly 24, and the pump and the drive assembly are mounted on a horizontally moveable carriage 25 which moves on a carriage support 26. Each of the manifold assemblies 18 includes a connection for one or more supply hoses (not shown). The molten thermoplastic material is pumped from the manifold assembly 18 to dispensing heads through the supply hoses.

Figure 3:
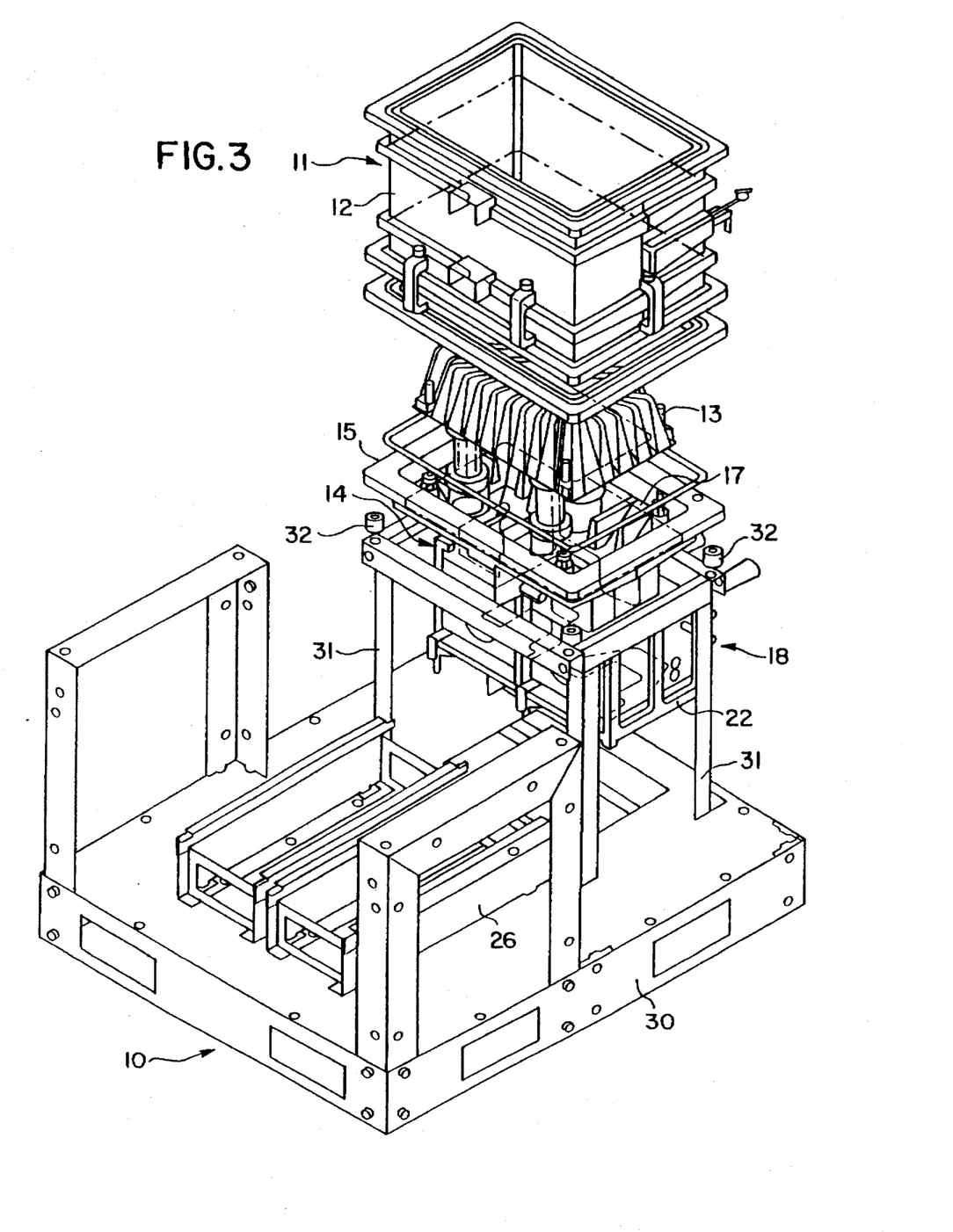
FIG. 3 is another exploded perspective view of the thermoplastic supply system of FIGS. 1 and 2 taken from the rear of the system with the support structure included, but with the drive assembly removed.

The support structure for the supply system 10 is not shown in FIGS. 1 and 2 for the sake of clarity, but it is depicted in FIG. 3. As shown in FIG. 3, the supply system 10 is supported on a base 30 upon which a upstanding frame 31 is mounted. The carriage support 26 is also mounted on the base 30. The reservoir block 16 is supported on the frame 31 with a plurality of isolating spacers 32 mounted therebetween.

While two flow shutoff valves, two manifold assemblies, and two pumps and drive assemblies are shown or described, this is intended to show a typical configuration of the system, and it should be understood that one or more of each of these elements could be used.

As used herein, the "front" of the system 10 and its components is considered to be the side of the system extending forward and to the right in FIGS. 1 and 2, which is also the side from which the shutoff valves 21 are mounted. The "rear" of the system 10 and its components is considered to be the opposite side, that is, the side extending back and to the left in FIG. 1 and 2, which is also the side from which the drive assembly 24 extends.

Figure 4:
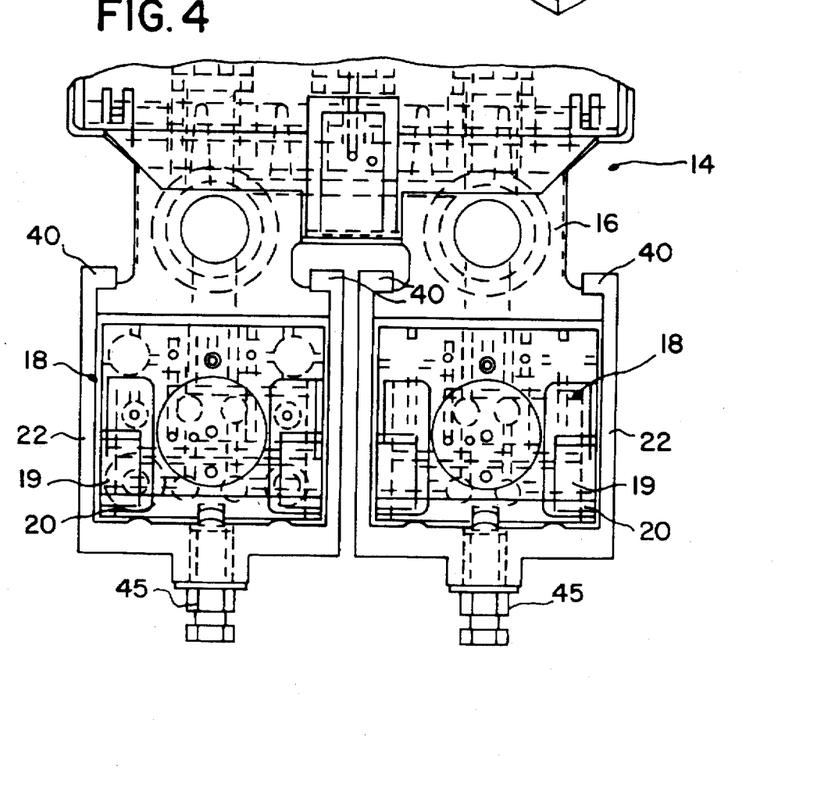
FIG. 4 is a front elevational view of a portion of the thermoplastic supply system of FIGS. 1–3 showing the manifold assembly mounted in the support harness.
Figure 5:
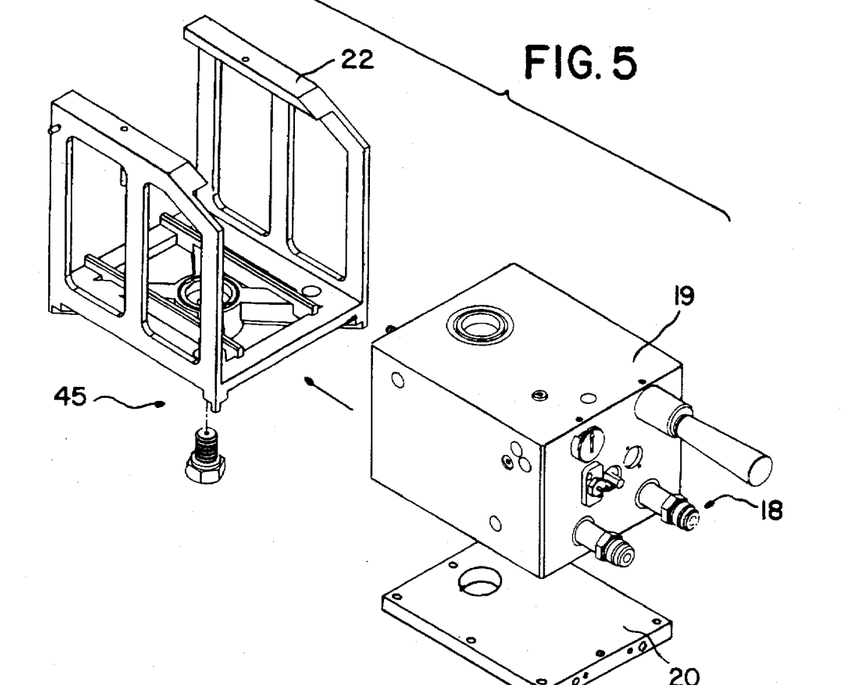
FIG. 5 is a perspective exploded view of the manifold assembly and support harness of FIG. 4.
Figures 6, 7:
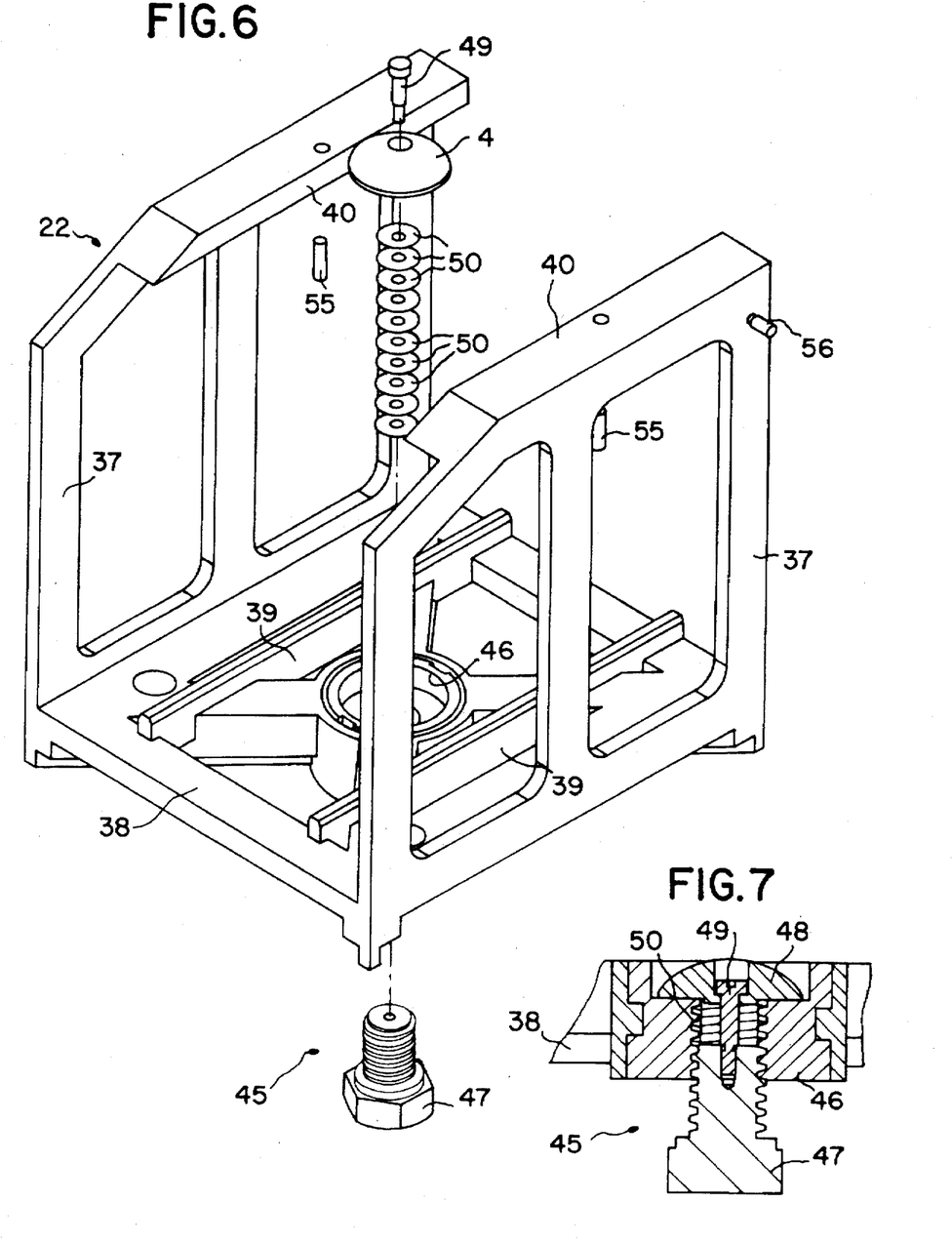
FIG. 6 is a detailed perspective view of the support harness of FIG. 5.
FIG. 7 is a side sectional view of the screw jack assembly located at the bottom of the support harness of FIG. 6.

Referring to FIGS. 4 and 5, it can be seen that the manifold assembly 18 is mounted on the manifold saddle or harness 22 which is, in turn, suspended from the bottom of the reservoir block 16. The manifold harness 22, which is shown in more detail in FIG. 6, comprises a cast frame having side portions 37 and a bottom portion 38. The frame has an open front end for insertion of the manifold assembly 18. The top of the side portions 37 have inwardly extending flanges 40 for attachment to the bottom of the reservoir block 16. A pair of tracks 39 are formed on the bottom portion 38 extending parallel to the side portions 37 to assist in sliding the manifold assembly 18 into the harness 22 and to align the manifold assembly as it is inserted into the harness. As discussed below, the manifold assembly 18 is provided with corresponding slots in its bottom surface in which the tracks 39 fit. The slots in the manifold assembly do not extend all the way to the front of the manifold assembly, and the corresponding tracks 39 in the harness also stop before they reach the front, so that the sliding movement of the manifold assembly 18 is halted when the tracks reach the end of the slots.

A screw jack assembly 45 is provided in the center of the bottom portion 38. The screw jack assembly 45 is shown in detail in FIG. 7. The screw jack assembly 45 comprises a threaded insert 46 which is positioned in a corresponding opening in the bottom frame portion 38. A jack screw 47 is threaded upwardly into the opening, and a concave thrust element 48 is attached to the jack screw 47 by means of a bolt 49. A plurality of spring washers 50 are positioned on the bolt 49 between the thrust element 48 and the jack screw 47.

To assist in mounting the harness to the bottom of the reservoir block 16, the harness 22 has a pair of locating pins 55 (FIG. 6) which extend vertically downwardly from the top flanges 40 of the side portions 37, and a removable pin 56 which extends horizontally inwardly from the rear of one of the side portions 37. Both of the side portions 37 have openings for mounting of the horizontally extending pins 56, so that the harness 22 is symmetrical and can be used on either the left or right side of the reservoir block. However, only one horizontally extending pin 56 need be provided, and this pin would be positioned on the side portion 37 that is located on the exterior of the system.

As indicated in FIG. 5, the manifold assembly 18 may comprise the manifold block 19 and the manifold heater plate 20. While the manifold block itself may be provided with internal heating means, either through the use of cast-in heating elements or through the use of heating cartridges inserted into the manifold block, the use of a separate manifold heater plate provides advantages since it allows the heating element to be contained in a separate member which can be removed and replaced as needed if the heating element fails.

Figures 8, 9:
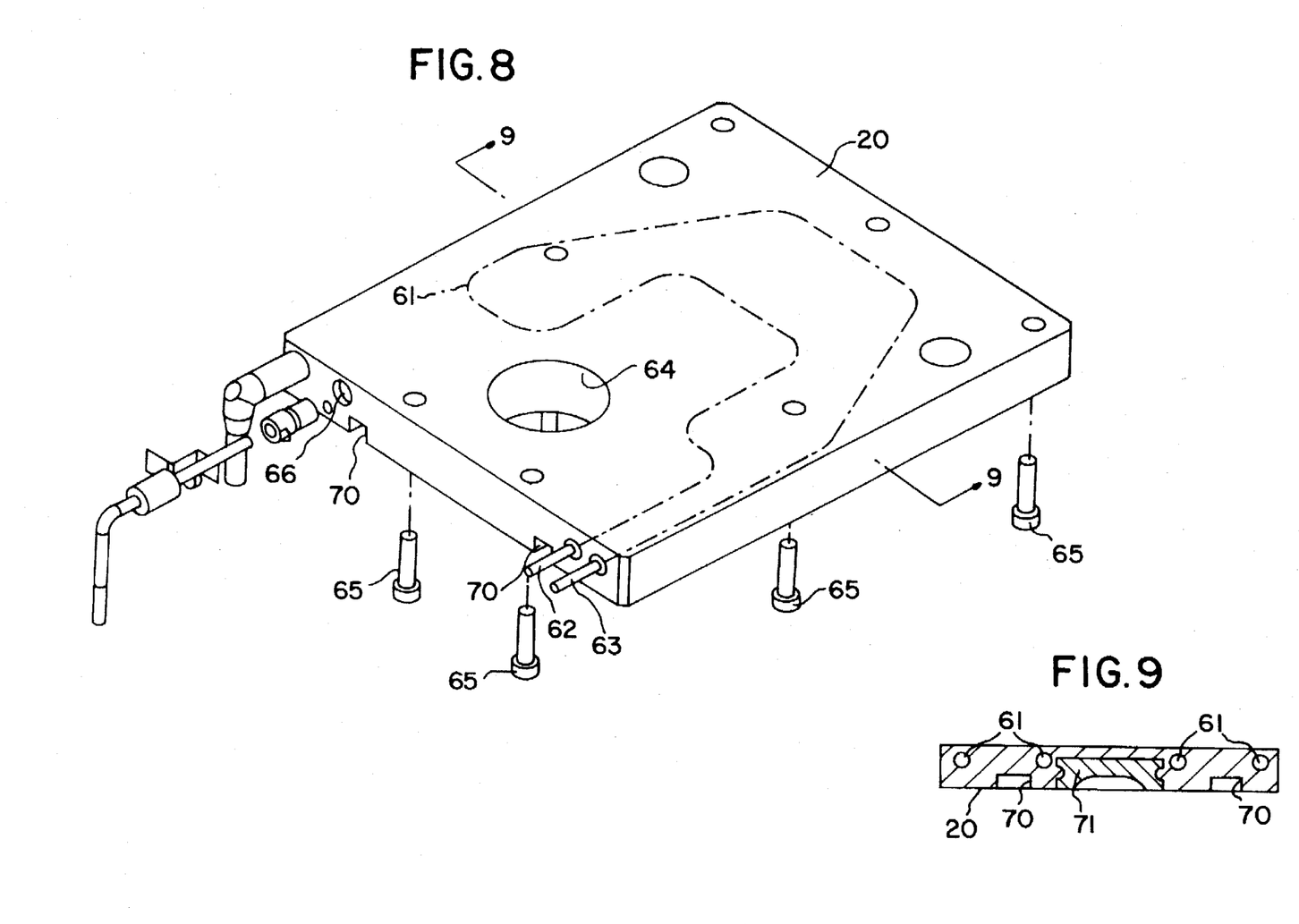
FIG. 8 is detailed perspective view of the heater plate of FIG. 5.
FIG. 9 is a side sectional view of the heater plate taken along line 9—9 of FIG. 8.

The manifold heater plate 20 is shown in more detail in FIG. 8. The plate 20 is generally rectangular and is made from a casting of a suitable material, such as aluminum, which has good heat conductivity. An electrical induction heating element 61 is cast into the plate 20, with terminals 62 and 63 extending from the rearward end of the plate for connection to a suitable electric cable (not shown) which leads to a control. The plate 20 also has a opening 66 at its rearward end for insertion of a suitable temperature probe, such as an RTD or thermocouple. A drain opening 64 is provided in the plate, coaxial with a drain in the manifold block 19. The manifold heater plate 20 is attached to the manifold block 19 by a plurality of bolts 65.

Figure 10:
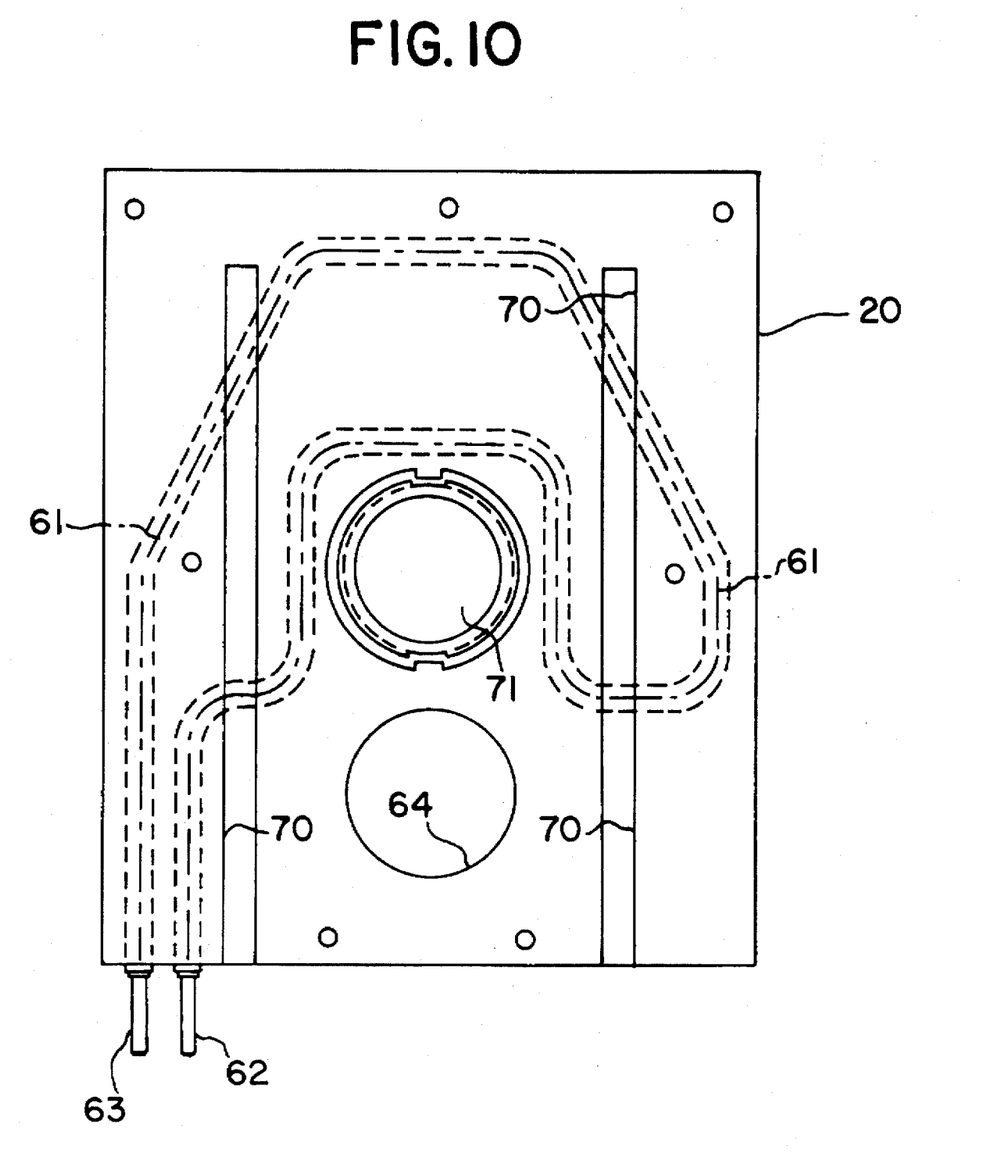
FIG. 10 is a bottom plan view of the heater plate of FIG. 8.

The bottom surface of the manifold heater plate 20 includes a pair of slots 70 (FIG. 10) each of which is adapted to fit within one of the corresponding tracks 39 in the manifold harness. Each of the slots 70 extends to the rearward end of the plate, but does not extend to the forward end of the plate to permit the manifold assembly 18 to be positioned in the harness 22. The bottom Of the plate 20 also has a thrust engaging member 71 (FIG. 9) inserted in the middle of the plate. The thrust engaging member 71 is made of material which is harder than the aluminum of the cast plate 20 and provides a hard surface for engagement by the screw jack assembly 45. Preferably the thrust engaging member 71 has a concave bottom surface to match the convex upper surface of the thrust element 48 of the jack screw assembly to provide for stable engagement of the jack screw assembly with the manifold assembly and to assist in positioning of the manifold assembly relative to the harness. As shown particularly in FIG. 10, the cast-in heating element 61 is positioned within the heater plate so that it winds around the thrust engaging member 71 and does not interfere with the location of the thrust engaging member at the center of the plate.

In use, the manifold assembly 18 is inserted into the harness 22 through the open front of the frame as shown in FIG. 5 with the slots in the bottom of the manifold assembly engaging the tracks 39 on the bottom frame portion 38. The manifold assembly 18 slides into the harness 22 until the end of the slots engage the end of the tracks 39 stopping any further movement. At this point, the user employs a wrench or other device to turn the jack screw 47 and use the screw jack assembly 45 to move the manifold assembly 18 upwardly within the harness 22 until the top of the manifold assembly engages the bottom of the reservoir block 16. The manifold assembly 18 is in place in sealing engagement with the reservoir block 16 when the jack screw 47 bottoms out. The spring washers 50 provide manufacturing tolerance to assure that the manifold assembly is in place against the reservoir block when the jack screw bottoms out. After the manifold assembly 18 is fully raised against the reservoir block 16, further turning of the jack screw 47 will only serve to compress the spring washers 50. The harness 22 thus not only supports the weight of the manifold assembly 18, the harness also positions the manifold assembly relative to the reservoir block 16, so that the manifold assembly can be inserted into the harness and accurately and easily raised into sealing engagement with the reservoir block.

It is preferred that the jack screw be provided with a hex head for engagement by a wrench. Alternatively, the jack screw could take other forms and be engaged in other ways, such as a lever which could be hand operated. The hex head is preferred since it avoids inadvertent loosing of the jack screw, which would result in the manifold assembly dropping down in the harness and losing the seal between the manifold assembly and the reservoir block and the escape of molten thermoplastic material.

Other variations and modifications of the specific embodiments herein shown and described will be apparent to those skilled in the art, all within the intended spirit and scope of the invention. While the invention has been shown and described with respect to particular embodiments thereof, these are for the purpose of illustration rather than limitation. Accordingly, the patent is not to be limited in scope and effect to the specific embodiments herein shown and described nor in any other way that is inconsistent with the extent to which the progress in the art has been advanced by the invention.

What is claimed is:

1. A system for supplying melted thermoplastic material to a dispenser, which comprises:

a hopper for storing the thermoplastic material;

a heating grid associated with the hopper for heating and melting the thermoplastic material;

a reservoir block for receiving melted material from the grid, the reservoir block including a reservoir into which the melted material flows from the grid;

a support harness attached to the reservoir block; and a manifold assembly supported in the harness below the reservoir block for receiving material from the reservoir, the manifold assembly including a pump for pumping the material to the dispenser.

2. A system for supplying melted thermoplastic material as defined in claim 1, wherein the manifold assembly is capable of moving vertically within the harness between an upper position in engagement with the reservoir block and a lower position, and the manifold assembly is capable of horizontal movement with respect to the support harness when it is in the lower position.

3. A system for supplying melted thermoplastic material as defined in claim 1, comprising in addition a lifting mechanism connected to the support harness for moving the manifold assembly vertically within the harness.

4. A system for supplying melted thermoplastic material as defined in claim 1, wherein the manifold assembly slides horizontally in and out of the support harness.

5. A system for supplying melted thermoplastic material as defined in claim 1, wherein the support harness is attached to the bottom of the reservoir block.

6. A system for supplying melted thermoplastic material, as defined in claim 1, wherein the manifold assembly comprises a manifold block and a heater plate removably attached to the manifold block.

7. A system for supplying melted thermoplastic material to a dispenser, which comprises:

a hopper for storing the thermoplastic material;

a heating grid associated with the hopper for heating and melting the thermoplastic material;

a reservoir assembly for receiving melted material from the grid, the reservoir assembly including a reservoir into which the melted material flows from the grid;

a manifold assembly supported below the reservoir assembly for receiving material from the reservoir, the manifold assembly including a pump for pumping the material to the dispenser; and a lifting mechanism for moving the manifold assembly vertically with respect to the reservoir assembly between an upper position in engagement with the reservoir assembly and a lower position.

8. A system for supplying melted thermoplastic material as defined in claim 7, wherein the lifting mechanism comprises a screw jack assembly.

9. A system for supplying melted thermoplastic material to a dispenser, which comprises:

a hopper for storing the thermoplastic material;

a heating grid associated with the hopper for heating and melting the thermoplastic material;

a reservoir assembly for receiving melted material from the grid, the reservoir assembly including a reservoir into which the melted material flows from the grid;

a support harness attached to the reservoir block;

a manifold assembly supported in the harness for receiving material from the reservoir, the manifold assembly including a pump for pumping the material to the dispenser, the manifold assembly capable of horizontal movement into and out of the harness; and a screw jack lifting mechanism for moving the manifold assembly vertically with respect to the reservoir assembly when the manifold assembly is in the harness between an upper position in engagement with the reservoir assembly and a lower position.

10. A system for supplying melted thermoplastic material to a dispenser, which comprises:

a hopper for storing the thermoplastic material;

a heating grid associated with the hopper for heating and melting the thermoplastic material;

a reservoir block for receiving melted material from the grid, the reservoir block including a reservoir into which the melted material flows from the grid;

a manifold assembly supported below the reservoir block for receiving material from the reservoir, the manifold assembly including a manifold block containing a pump for pumping the material to the dispenser, and a heater plate removably attached to the manifold block.

11. A system for supplying melted thermoplastic material as defined in claim 10, wherein the heater plate has a heater element cast into the plate.

12. A system for supplying melted thermoplastic material as defined in claim 10, comprising in addition a lifting mechanism for moving the manifold assembly vertically with respect to the reservoir block between an upper position in engagement with the reservoir block and a lower position.

13. A system for supplying melted thermoplastic material as defined in claim 12, wherein the heater plate includes a bearing portion for engagement by the lifting mechanism.

14. A system for supplying melted thermoplastic material as defined in claim 13, wherein the bearing portion is made of a material which is harder than the remainder of the heater plate.

15. A system for supplying melted thermoplastic material as defined in claim 13, wherein the heating element winds around the bearing portion to avoid interfering with the operation of the bearing portion.

* * * * *

UNITED STATES PATENT AND TRADEMARK OFFICE
CERTIFICATE OF CORRECTION

PATENT NO : 5,680,963
DATED : October 28, 1997
INVENTOR(S) : Brusko et al.

It is certified that error appears in the above-identified patent and that said Letters Patent is hereby corrected as shown below:

Column 2, line 67, "liking" should be -- lifting --.
Column 5, line 62, "Of" should be -- of --.

Signed and Sealed this

Seventeenth Day of February, 1998

*Attest:*

BRUCE LEHMAN

*Attesting Officer*  *Commissioner of Patents and Trademarks*